US009823748B2

(12) United States Patent
Nicholson et al.

(10) Patent No.: US 9,823,748 B2
(45) Date of Patent: Nov. 21, 2017

(54) CONTROL INPUT HANDLING (71) Applicant: Lenovo (Singapore) Pte. Ltd., Singapore (SG)

(72) Inventors: John Weldon Nicholson, Cary, NC (US); Aaron Michael Stewart, Raleigh, NC (US); Corinna Paine Proctor, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 61 days.

(21) Appl. No.: 14/174,952

(22) Filed: Feb. 7, 2014

(65) Prior Publication Data
US 2015/0227209 A1 Aug. 13, 2015

(51) Int. Cl.
| | |
|---|---|
| *G06F 3/01* | (2006.01) |
| *G06F 3/03* | (2006.01) |
| *H04N 21/422* | (2011.01) |
| *H04N 21/47* | (2011.01) |

(52) U.S. Cl.
CPC ............ *G06F 3/017* (2013.01); *G06F 3/0304* (2013.01); *H04N 21/422* (2013.01); *H04N 21/47* (2013.01)

(58) Field of Classification Search
CPC ...... G06F 3/017; G06F 3/04883; G06F 21/31; G06F 3/011; G10L 15/22; G10L 15/26; G10L 15/30; G10L 2015/223; G10L 13/00; G10L 21/06; G10L 17/22; G10L 2015/228; G10L 15/00; G10L 15/265; G10L 2015/0631; G10L 15/28; G10L 15/06; G10L 15/193

USPC ............... 345/156; 715/863, 750, 741, 727; 382/103, 115, 118; 725/25; 726/2; 704/231, 275

See application file for complete search history.

(56) References Cited

U.S. PATENT DOCUMENTS

| | | | |
|---|---|---|---|
| 6,359,661 | B1 | 3/2002 | Nickum |
| 2008/0262849 | A1* | 10/2008 | Buck ..................... G10L 15/28 704/275 |
| 2009/0079813 | A1* | 3/2009 | Hildreth .................... 348/14.03 |
| 2009/0183098 | A1 | 7/2009 | Casparian et al. |
| 2009/0217211 | A1* | 8/2009 | Hildreth et al. ............. 715/863 |
| 2011/0026765 | A1* | 2/2011 | Ivanich et al. ............... 382/103 |
| 2011/0072452 | A1* | 3/2011 | Shimy .................... H04N 7/163 725/25 |
| 2011/0154266 | A1* | 6/2011 | Friend et al. ................ 715/863 |

(Continued)

FOREIGN PATENT DOCUMENTS

EP    2579608 A1    4/2013

*Primary Examiner* — Koosha Sharifi-Tafreshi
(74) *Attorney, Agent, or Firm* — Ference & Associates LLC (57) ABSTRACT

An aspect provides a method, including: accepting, at an input component of an information handling device, input of a user; identifying, using a processor, the input of the user as controlling input; determining, using a processor, one or more control factors associated with the controlling input; classifying, using a processor, the controlling input as one of a permissible control action and an impermissible control action for an application running on the information handling device based on the one or more control factors; and performing an action selected from the group consisting of: accepting, at the input component, confirming input; and providing feedback to one or more users. Other aspects are described and claimed.

15 Claims, 4 Drawing Sheets

(56) References Cited

U.S. PATENT DOCUMENTS

| | | | |
|---|---|---|---|
| 2011/0224978 A1* | 9/2011 | Sawada | G06K 9/00221 704/231 |
| 2012/0278729 A1* | 11/2012 | Vennelakanti et al. | 715/750 |
| 2013/0127712 A1* | 5/2013 | Matsubayashi | H04N 21/42203 345/158 |
| 2013/0307774 A1* | 11/2013 | Hayashi | G06F 3/017 345/158 |
| 2014/0089864 A1* | 3/2014 | Cheng | G06F 3/0233 715/863 |
| 2014/0181910 A1* | 6/2014 | Fingal | H04L 63/107 726/4 |
| 2014/0354527 A1* | 12/2014 | Chen | G06F 3/017 345/156 |
| 2015/0331490 A1* | 11/2015 | Yamada | G06F 3/017 345/156 |

* cited by examiner

CONTROL INPUT HANDLING

BACKGROUND

Information handling devices ("devices") come in a variety of forms, for example desktop or laptop computing devices, tablet computing devices, smart phones, smart televisions (TVs), gaming consoles, and the like. Natural user interfaces are increasingly being utilized to provide user inputs to such devices. For example, a natural user interface allows for multiple input modalities (such as camera/gesture inputs, audio/voice inputs, touch inputs, etc.) to be utilized for controlling applications running on such devices. Current examples of natural user interfaces and devices controllable therewith are gaming systems that accept voice and/or gesture controlling inputs, such as Microsoft's XBOX KINECT system. XBOX KINECT is a trademark of Microsoft Corporation in the United States and other countries.

BRIEF SUMMARY

In summary, one aspect provides a method, comprising: accepting, at an input component of an information handling device, input of a user; identifying, using a processor, the input of the user as controlling input; determining, using a processor, one or more control factors associated with the controlling input; classifying, using a processor, the controlling input as one of a permissible control action and an impermissible control action for an application running on the information handling device based on the one or more control factors; and performing an action selected from the group consisting of: accepting, at the input component, confirming input; and providing feedback to one or more users.

Another aspect provides an information handling device, comprising: an input component; a processor operatively coupled to the input component; a memory device that stores instructions accessible to the processor, the instructions being executable by the processor to: accept, at the input component, input of a user; identify the input of the user as controlling input; determine one or more control factors associated with the controlling input; classify the controlling input as one of a permissible control action and an impermissible control action for an application running on the information handling device based on the one or more control factors; and perform an action selected from the group consisting of: accepting, at the input component, confirming input; and providing feedback to one or more users.

A further aspect provides a product, comprising: a storage device having code stored therewith, the code being executable by a processor and comprising: code that accepts, at an input component of an information handling device, input of a user; code that identifies, using a processor, the input of the user as controlling input; code that determines, using a processor, one or more control factors associated with the controlling input; code that classifies, using a processor, the controlling input as one of a permissible control action and an impermissible control action for an application running on the information handling device based on the one or more control factors; and code that performs an action selected from the group consisting of: accepting, at the input component, confirming input; and providing feedback to one or more users.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While natural user interfaces are increasingly being utilized to provide user inputs, e.g., to gaming systems, smart televisions, etc., and while users enjoy the additional input modalities afforded thereby, a problem may arise in connection therewith. For example, in using a natural user interface to provide inputs, conventional systems do not typically discriminate between controlling inputs. That is, either a controlling input is received, identified, and executed or it is not. There is currently no attempt to distinguish if a command, although received and understood, should nonetheless be disregarded. Moreover, inputs or commands may conflict or be unnecessarily repetitive, e.g., if users issue conflicting or repetitive commands that are received at substantially the same time. Additionally, there is generally no feedback given to the user, either in terms of which commands are recognized, committed or from which user commands may be issued. Thus current/conventional natural user interface systems operate on the assumption that everyone (i.e., any user issuing a controlling input/command) is permitted to control the system.

In some cases, it may be beneficial to distinguish between users by way of a physical device, e.g., user holds a particular token and is thus permitted to issue controlling inputs. In other cases, it may be beneficial to distinguish between users by way of an authentication or login session such that a single, authenticated user maintains control. However, as will be appreciated from the description herein, each of the prior approaches has some drawbacks, not the least of which is inflexibility in switching between controlling users to accommodate dynamically changing scenes.

Accordingly, an embodiment provides a method for distinguishing between user control inputs (e.g., by virtue of a user's rank or priority) and responding to command/control inputs received on the basis thereof, e.g., executing some commands from priority users while filtering or disregarding commands issued from other, non-priority users. Some additional information regarding distinguishing users in this regard is provided in co-pending and commonly assigned U.S. patent application Ser. No. 14/174,967, entitled "CONTROL INPUT FILTERING", filed concurrently herewith and incorporated by reference herein.

As part of this process, an embodiment may allow users to pass control to one another. An embodiment may intelligently filter simultaneous (or substantially simultaneous) inputs or commands, e.g., conflicting or repetitive commands. An embodiment may additionally offer the user(s) feedback both in terms of resolving conflicting and repetitive inputs, switching between controlling users, and indicating which user currently has control of the system.

In an embodiment, an input component such as a microphone of an information handling device accepts input of a user, e.g., an input voice command. The input of the user is processed to identify a controlling input, e.g., a command matched to an underlying application feature such as adjusting the volume in a media player application, browsing back to a previous page in a web browser, etc. An embodiment may then determine one or more control factors associated with the controlling input, e.g., from which user (or which type of user) has the input been received. Taking into account the control factor(s), an embodiment may then classify the controlling input as a permissible control action and an impermissible control action.

For example, a permissible control action may be, but is not limited to, a volume adjustment from any user, a back command in a web browser from a priority user, etc. An impermissible command may include, but is not limited to, a command from a lower priority user, e.g., a child, attempting to change a television channel to restricted content, etc. An impermissible control action may also include, but is not limited to, conflicting and/or repetitive inputs, e.g., in a multiple user scenario.

Given the determination of whether a user input is associated with a permissible or impermissible control action, e.g., based on consideration of various control factors, an embodiment may perform an appropriate action. For example, an embodiment may perform an action such as accepting, e.g., at the input component, a confirming input form the currently controlling user and/or a higher priority user, e.g., authorizing an impermissible command received from a lower priority user and/or passing control to another user. An embodiment may also perform an action such as providing feedback to one or more users, e.g., soliciting input to disambiguate conflicting or repetitive commands.

An embodiment may also perform an appropriate action responsive to determining that the user input is associated with a permissible control action, e.g., committing the control action. Likewise, an embodiment may perform an additional action associated with the permissible control action, e.g., providing an indication that the system is focused on a particular user issuing the user input, such as a visual indication.

The illustrated example embodiments will be best understood by reference to the figures. The following description is intended only by way of example, and simply illustrates certain example embodiments.

Figure 1:
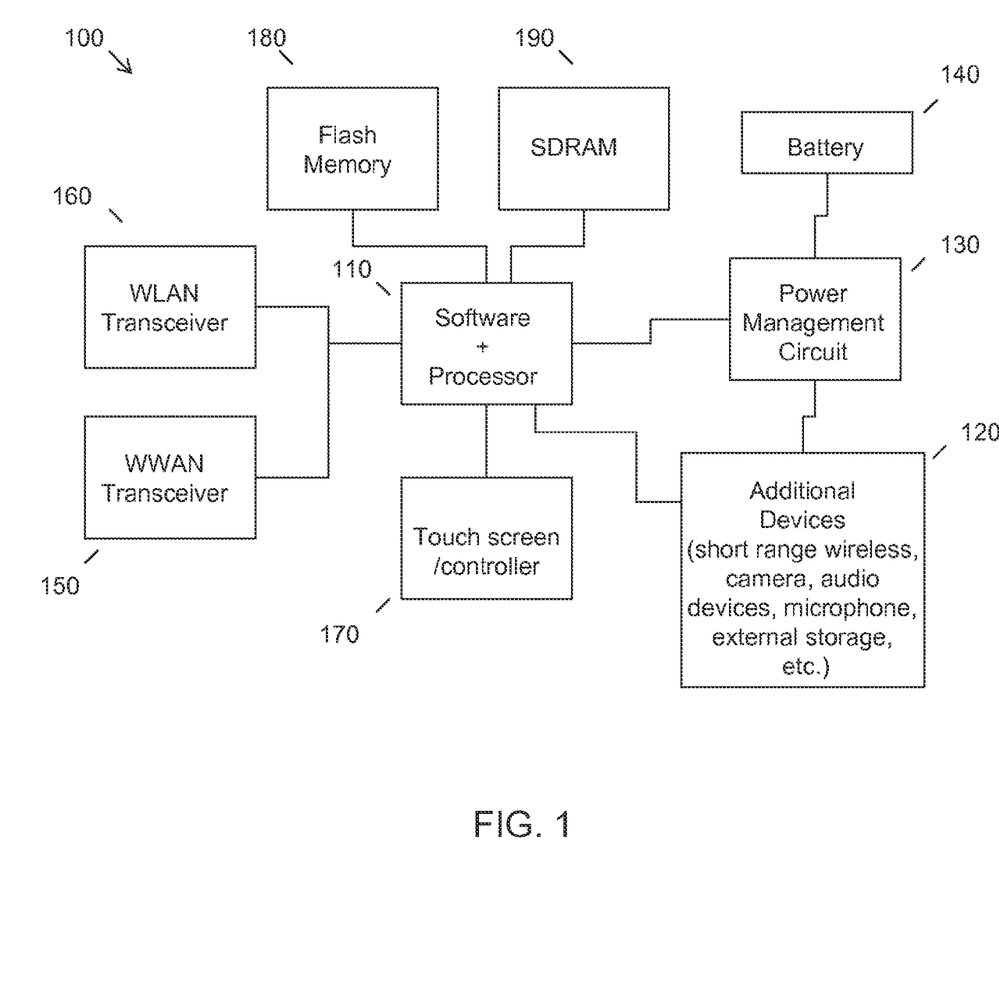
FIG. 1 illustrates an example of information handling device circuitry.

While various other circuits, circuitry or components may be utilized in information handling devices, with regard to smart phone and/or tablet-like circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included, such as a camera for receiving gesture inputs and/or a microphone for receiving audio inputs. System 100 may include a touch screen 170 for data input and display/rendering. System 100 also typically includes various memory devices, for example flash memory 180 and SDRAM 190.

Figure 2:
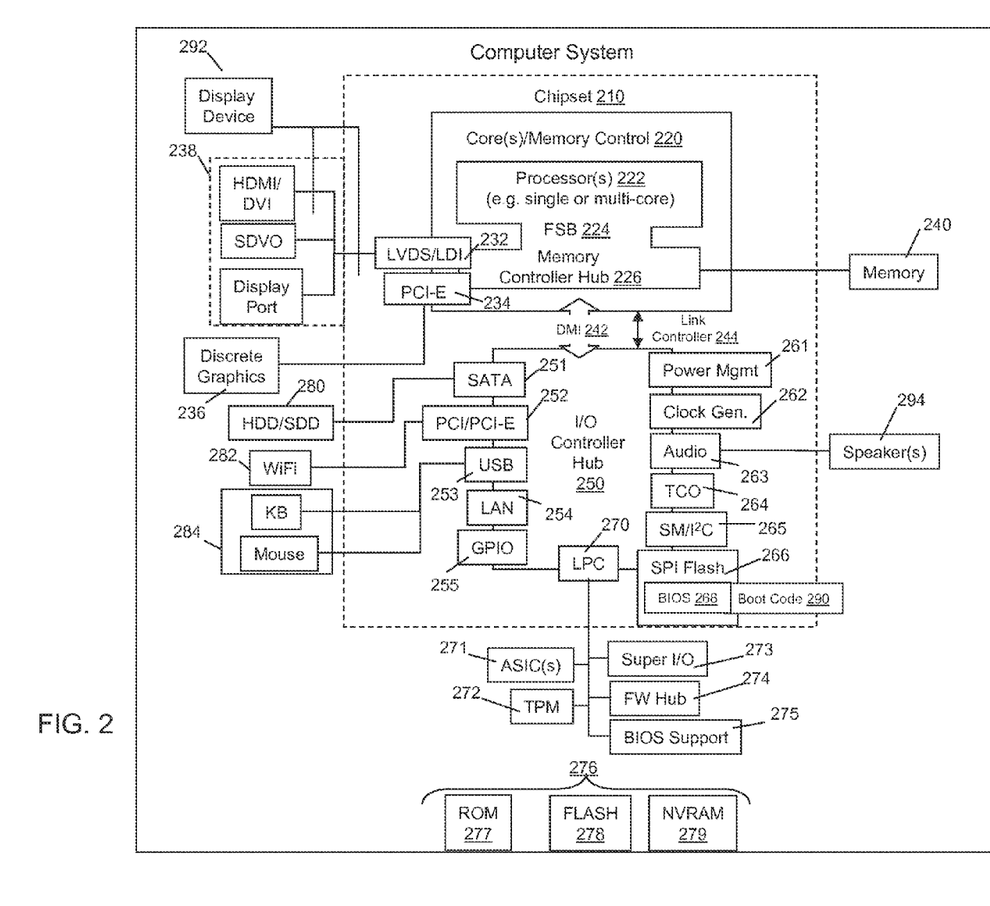
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be included in user devices such as smart TVs, gaming consoles and other user devices that operate in concert with natural user interfaces, e.g., accepting user inputs such as gesture user inputs, voice commences, etc. As described herein, however, in certain situations simply faithfully identifying and executing natural user input controls/commands is inadequate. This may be particularly exacerbating in multi-user environments where inadvertently repeated inputs are issued by user(s) and/or conflicting controlling inputs are provided by different users either simultaneously or in rapid succession.

Figure 3:
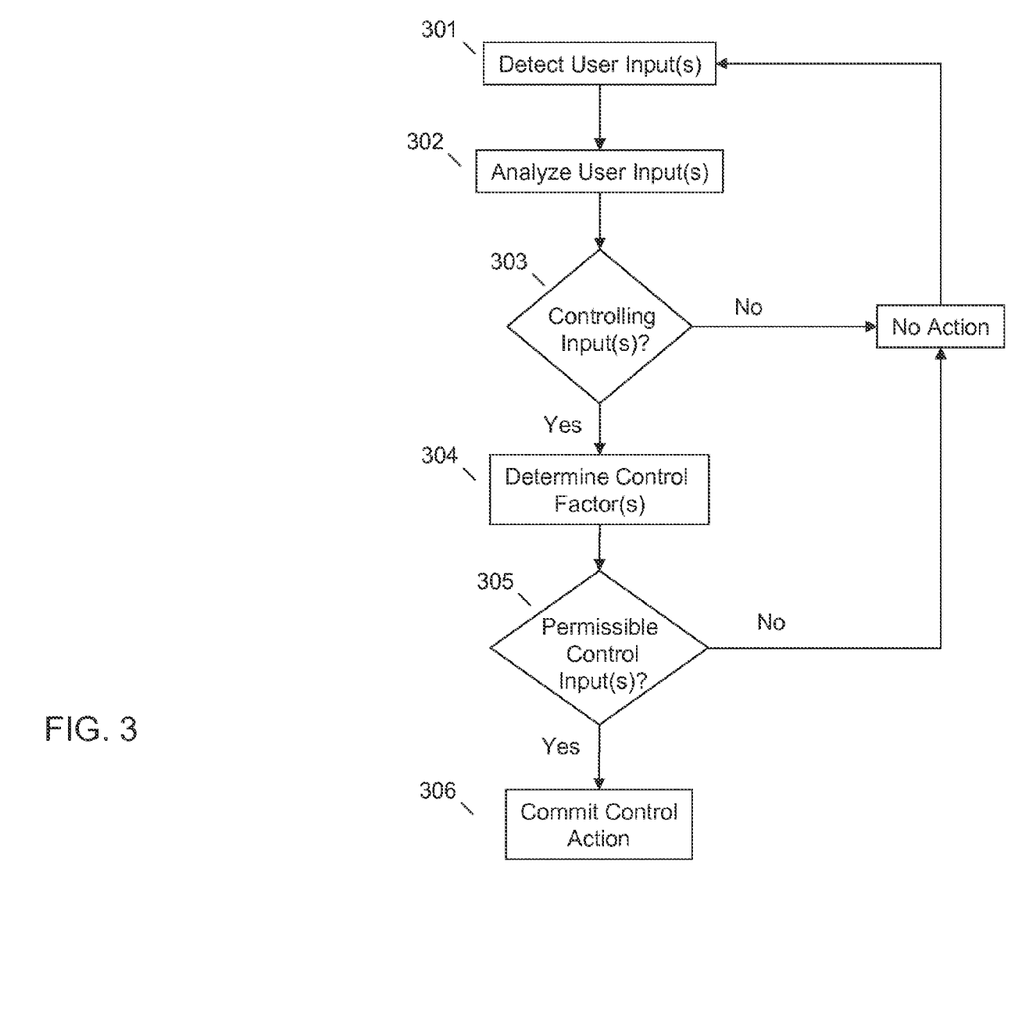
FIG. 3 illustrates an example of control input filtering.

Accordingly, referring to FIG. 3, an embodiment provides mechanisms to distinguish between controlling inputs issued by various users and thus implement intelligent control input filtering, including confirming inputs issued from non-controlling or non-authorized users, passing control of the system to new users, and/or providing feedback to the user(s) regarding inputs and the interpretation thereof.

An embodiment may accept/detect input of a user at 301, e.g., using a natural user input component such as a camera that detects gesture inputs and/or a microphone and speech recognition engine that detects voice commands. An embodiment may analyze the user inputs at 302, e.g., to identify the input of the user as including a controlling input.

Thus, while an embodiment may continuously receive user inputs, e.g., detect user voices, capture user movements, these are analyzed at 302 to determine if any of the inputs map to controlling user inputs, e.g., volume up/down voice commands, gesture inputs mapped to application controls, etc.

If a controlling input is identified at 303, an embodiment may proceed to determine if no action should be taken, e.g., input filtered, or if an action should be committed on the basis of the received controlling input. Of course, if no controlling input is identified at 303, e.g., only background noise or user movements not matched/mapped to control gestures, an embodiment may take no action and continue to detect user inputs in search of a controlling input.

If an embodiment does identify a controlling input at 303, an embodiment may determine at 304 one or more control factors associated with the controlling input. Control factors may include but are not necessarily limited to an explicit user setting, a user rank, a category of content processed by the application running on the information handling device, time of scene entry of a user, time, posture of a user, size characteristic of a user, audio characteristic of a user, location of a user, sequence of user inputs, control permission settings, and input modality.

It should be appreciated that the various control factors, such as the non-limiting examples described herein, may be used (either alone or in some suitable combination) to classify the controlling input as a permissible control action for an application running on the device based on the one or more control factors at 305. If the control input is determined to be permissible based on such classification, an embodiment may commit a permissible control action associated with or mapped to the control input responsive to the classifying at 306.

Figure 4:
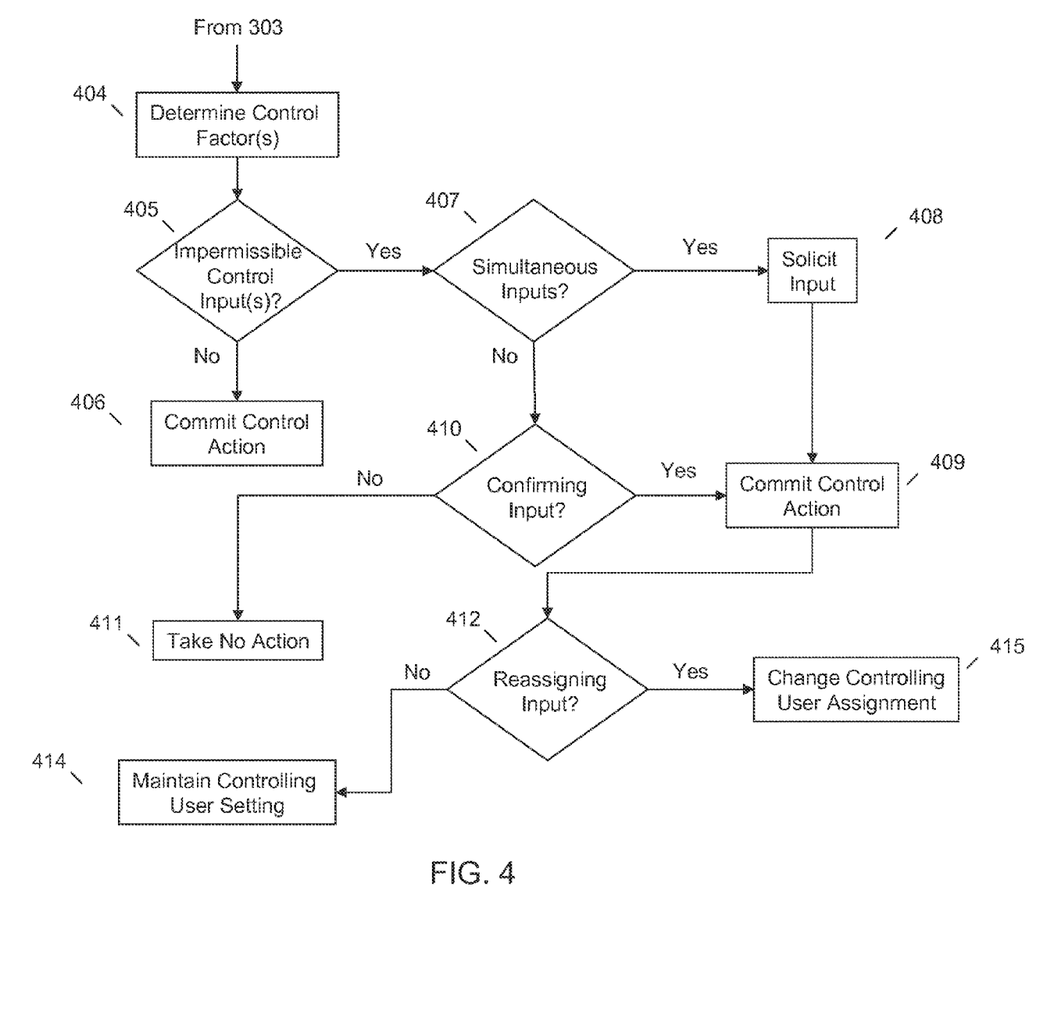
FIG. 4 illustrates examples of control input handling using confirming input and/or feedback communications.

Referring to FIG. 4, following detecting controlling input(s) has/have been received, and determining control factors associated therewith at 404, an embodiment may further determine if the control input is impermissible at 405, e.g., similar to the determination made at 305 of FIG. 3. If not, an embodiment again may commit the control action at 406 and may additionally provide user feedback, e.g., such as a visual indication rendered on the display screen to make the user(s) aware of the system's focus, as further described herein.

However, if it is determined at 405 that the control input(s) are impermissible, as described herein, an embodiment may attempt to classify the impermissible input(s) further. For example, an embodiment may determine if the control inputs are simultaneous inputs that conflict or are repetitive, as indicated at 407. If so, an embodiment may solicit input from the users at 408, e.g., in an attempt to determine, using the additional inputs, which conflicting or repetitive controlling inputs should be acted on, e.g., as illustrated at 409.

Likewise, if the impermissible controlling inputs are not simultaneous (or nearly so), as determined at 407, an embodiment may determine if there is a confirming input, as illustrated at 410. Thus, an embodiment may determine at 405 that an impermissible input has been received, e.g., from a non-controlling user and/or a lower priority user. If so, an embodiment may honor the impermissible input, e.g., if confirming input is received, as determined at 410, e.g., from a currently controlling user and/or a higher priority user and/or a user with appropriate permission level for the action in question. If confirming input is received, an embodiment may again act on the impermissible request as illustrated at 409. Otherwise, no action may be taken, as illustrated at 411.

An embodiment may additionally determine if a reassigning input has been received at 412, e.g., in connection with or in addition to the confirming input. For example, an authorized or currently controlling user may confirm another user's impermissible input and additionally pass control to the other user via providing reassigning input, e.g., as determined at 412. The reassigning input may take a variety of forms, e.g., voice input, gesturing input, etc., that is/are mapped to system control reassignment. If reassignment input is detected, an embodiment may then reassign control of the system, as illustrated at 415. Otherwise, the currently controlling user may retain control of the system, as illustrated at 414.

Thus for example an embodiment provides a way for the user who is in control of the system to indicate to the system that a command provided (spoken, gestured, etc.) by another person should or should not be accepted. This may determine whether the command should be executed while avoiding problems such as the controller having to also perform the command (e.g., repeat the command), the controller having to provide an explicit "pass control" command (to the non-controller) before performing the command, and having the other user need to explicitly ask for control to be passed to them before performing the command. Thus, a non-controller is able to freely issue commands, which may or may not be deemed acceptable to the controller.

An embodiment therefore provides a method such that a command provided by a user other than the controller is accepted and additionally that future control should pass to that person. An embodiment also accounts for the situation in which the user performing the command, even if the current controller, does not have access or authorization rights for the recognized command, but someone else in the vicinity does.

Some embodiments may include an affirming mechanism, e.g., for providing confirming and/or reassigning input, that is selected from various formats, e.g., a salute gesture, a positive nod, drawing a checkmark in the air, saying "make it so", idleness (essentially no active veto of the command) etc. In an embodiment, a disaffirming mechanism may be included, e.g., to explicitly not confirm a command, such as a negative nod or other head gesture, saying "no" (or other vetoing verbiage), idleness (essentially no affirming command), etc.

As described herein, an embodiment may provide feedback in various forms. For example, an embodiment may respond to multiple users providing commands at the same time (or nearly so) in an effort to disambiguate conflicting or repetitive commands.

For example, such commands (e.g., two or more substantially simultaneous commands) may be understood, different, and not mutually exclusive, in which case a problem may arise in that both may be executed. Feedback may be shown visually (e.g., acting as a warning that the received command(s) may not work). A prompt may optionally be displayed, e.g., asking user(s) to confirm the commands.

As another example, two or more commands may also be understood, different, and mutually exclusive, in which case one command should be chosen to the exclusion of the other(s). In this case, an embodiment may employ a feedback mechanism to prompt users to confirm the command(s).

As another example, in the face of multiple simultaneous commands, one of the commands may be understood but not the other. In such a case, an embodiment may provide feedback to prompt users to confirm the commands. In a case where commands interfere with each other and neither is understood, an embodiment may provide feedback, e.g., requesting that the users repeat the commands.

An embodiment may also implement a delay, e.g., the system may understand a command but execute the command on a delay, thus allowing the user(s) the opportunity to cancel the command.

It is possible for an embodiment to detect multiple simultaneous voice commands and distinguish this situation from a single user speaking a command that is not recognized. This is possible through various mechanisms, e.g., utilizing a microphone array and a direction of arrival method or sound source localization algorithm. The algorithm may also utilize frequency harmonic signatures to detect that there are multiple speakers with different vocal signatures.

Feedback and prompting of which command(s) to act on may be affected by the "controlling rank" of the users involved. Commands from more highly ranked controllers may thus receive top-billing in the feedback mechanism and/or may be assumed to be default action, e.g., if there is no user input responding to the prompts given.

An embodiment may also provide a feedback mechanism which indicates, e.g., "looks" at, the user who is in control for clear indication of status/priority, as well as observation status, etc. One embodiment employs a personality and gain eyes (e.g., virtual rendition or other visual indicator) to look at the users in order to provide this focusing feedback. For example, an embodiment may nominally look at or otherwise focus the indicator on the controller, and the other user(s) would thus be able to know who has control. The system might also look at the other users when it thinks a command is being performed. If the user performing the command is not the controller, the system might then look back at the controller. Animations may be included, e.g., looking back to the current controller with raised eyebrows, prompting for or soliciting input for confirmation or rejection.

The "system eyes" or other indicator may be provided as a visual, e.g., on a primary display device and/or on a secondary display (e.g., on the "sensor bar"), or even made available in a distributed fashion (e.g., on each user's phone or tablet), operating in a coordinated manner. The sensor bar may consist of an array of indication lights that utilize relative position within the array, color and/or a unique blink pattern to identify attention toward a particular controller.

Described herein then are various embodiments that provide for intelligent handling of controls, including confirming of commands in various scenarios, passing control of the system, and providing various forms of feedback. The embodiments create a system in which a natural user interface is augmented to seamlessly handle multiple user scenarios.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing.

More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
accepting, at an input component of an information handling device, input of a user;
identifying, using a processor, the input of the user as controlling input, wherein the controlling input is associated with a predetermined action;
classifying, using the processor and at least one control factor, the controlling input as one of a permissible control action and an impermissible control action for an application running on the information handling device, wherein the predetermined action associated with the impermissible control action is not to be performed and wherein the at least one control factor comprises a priority associated with a user and wherein a control action identified as permissible is associated with a user having a higher priority;
responsive to classifying the controlling input as the impermissible control action, thereafter accepting, at the input component, confirming audio input from a user that confirms the controlling input and is selected from the group consisting of a high priority user and a currently assigned controlling user; and
performing the predetermined action associated with the controlling input in response to the confirming audio input.

2. The method of claim 1, wherein the predetermined action comprises committing a control action responsive to the confirming audio input without reassigning control to another user.

3. The method of claim 1, wherein the accepting confirming audio input comprises associating the confirming audio input with a currently assigned controlling user.

4. The method of claim 1, wherein the accepting confirming audio input comprises associating the confirming audio input with a higher priority user.

5. The method of claim 4, wherein the accepting input of a user comprises accepting gesture input of a currently assigned controlling user.

6. The method of claim 5, further comprising determining, using the processor, one or more control factors associated with the controlling input;
wherein said one or more control factors associated with the controlling input comprise an authorization level of the currently assigned controlling user.

7. The method of claim 6, wherein said control action lies without said authorization level of the currently assigned controlling user.

8. The method of claim 1, further comprising:
accepting reassigning input; and
reassigning a controlling user.

9. An information handling device, comprising:
an input component;
a processor operatively coupled to the input component;
a memory device that stores instructions accessible to the processor, the instructions being executable by the processor to:
accept, at the input component, input of a user;
identify the input of the user as controlling input, wherein the controlling input is associated with a predetermined action;
classify, using at least one control factor, the controlling input as one of a permissible control action and an impermissible control action for an application running on the information handling device, wherein the predetermined action associated with the impermissible control action is not to be performed and wherein the at least one control factor comprises a priority associated with a user and wherein a control action identified as permissible is associated with a user having a higher priority;

responsive to classifying the controlling input as the impermissible control action, thereafter accept, at the input component, confirming audio input from a user that confirms the controlling input and is selected from the group consisting of a high priority user and a currently assigned controlling user; and perform the predetermined action associated with the controlling input in response to the confirming audio input.

10. The information handling device of claim 9, wherein the instructions are further executable by the processor to commit a control action responsive to the confirming audio input.

11. The information handling device of claim 9, wherein to accept confirming audio input comprises associating the confirming audio input with a higher priority user.

12. The information handling device of claim 11, wherein the instructions are executable by the processor to determine one or more control factors associated with the controlling input;

wherein said one or more control factors associated with the controlling input comprise an authorization level of the currently assigned controlling user.

13. The information handling device of claim 12, wherein said control action lies without said authorization level of the currently assigned controlling user.

14. The information handling device of claim 9, wherein the instructions are further executable by the processor to:

accept reassigning input; and reassign a controlling user.

15. A product, comprising:

a storage device having code stored therewith, the code being executable by a processor and comprising:

code that accepts, at an input component of an information handling device, input of a user;

code that identifies, using a processor, the input of the user as controlling input, wherein the controlling input is associated with a predetermined action;

code that classifies, using the processor and at least one control factor, the controlling input as one of a permissible control action and an impermissible control action for an application running on the information handling device, wherein the predetermined action associated with the impermissible control action is not to be performed and wherein the at least one control factor comprises a priority associated with a user and wherein a control action identified as permissible is associated with a user having a higher priority;

responsive to classifying the controlling input as the impermissible control action, code that thereafter accepts, at the input component, confirming audio input from a user that confirms the controlling input and is selected from the group consisting of a high priority user and a currently assigned controlling user; and code that performs the predetermined action associated with the controlling input in response to the confirming audio input.

* * * * *